United States Patent
Kanazawa et al.

(10) Patent No.: US 8,328,261 B2
(45) Date of Patent: Dec. 11, 2012

(54) PICK-UP STYLE UTILITY VEHICLE WITH EXPANDABLE CARGO BED

(75) Inventors: Tomohiro Kanazawa, Osaka (JP); Hideyuki Takahashi, Kobe (JP); Yoichi Jinja, Osaka (JP); Takao Hamano, Kobe (JP); Masashi Sakata, Kobe (JP); Kazuhiro Morita, Kakogawa (JP); Yasushi Ishibashi, Akashi (JP); Kiyoaki Maeda, Kobe (JP); Tyler Furman, Lincoln, NE (US); Yoshihiro Masuda, Kobe (JP); Trey Govier, Lincoln, NE (US)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 397 days.

(21) Appl. No.: 12/646,126

(22) Filed: Dec. 23, 2009

(65) Prior Publication Data

US 2011/0148135 A1      Jun. 23, 2011

(51) Int. Cl.
*B62D 33/02*      (2006.01)
*B60N 2/10*       (2006.01)

(52) U.S. Cl. .................... 296/24.43; 296/183.1; 296/64; 296/66; 296/65.09

(58) Field of Classification Search .................. 296/165, 296/171, 175, 24.3, 24.33, 24.4, 24.43, 26.08, 296/62.09, 26.1, 26.11, 183.1, 183.2, 190.03, 296/191, 37.6, 64, 65.01, 66, 65.09; 280/756, 280/749
See application file for complete search history.

(56) References Cited

U.S. PATENT DOCUMENTS

| | | | | |
|---|---|---|---|---|
| 5,192,189 | A * | 3/1993 | Murata et al. | 414/477 |
| 6,394,555 | B2 * | 5/2002 | Mizuta et al. | 298/38 |
| 6,905,159 | B1 | 6/2005 | Saito et al. | |
| 6,994,388 | B2 | 2/2006 | Saito et al. | |
| 7,249,798 | B2 | 7/2007 | Saito et al. | |
| 7,578,544 | B1 * | 8/2009 | Shimamura et al. | 296/183.2 |
| RE42,086 | E * | 2/2011 | Saito et al. | 296/205 |
| 2009/0200823 | A1 * | 8/2009 | Vertanen | 296/26.08 |
| 2010/0060026 | A1 * | 3/2010 | Bowers | 296/66 |

* cited by examiner

*Primary Examiner* — Jason S Morrow
(74) *Attorney, Agent, or Firm* — Wenderoth, Lind & Ponack, LLP

(57) ABSTRACT

A pick-up style utility vehicle having a front seat and a rear seat. The pick-up style utility vehicle includes a cargo bed movement mechanism for supporting a cargo bed movably within a predetermined movement range in a back and forth direction. Also, a seat movement mechanism is provided for supporting the rear seat movably between a use position set to be within the movement range and a shunting position set to be out of or beyond the movement range.

6 Claims, 17 Drawing Sheets

PICK-UP STYLE UTILITY VEHICLE WITH EXPANDABLE CARGO BED

BACKGROUND OF THE INVENTION

1. Field of the Invention

The present invention relates to a pick-up style utility vehicle provided with a front seat and a rear seat.

2. Description of the Related Art

In general, a pick-up style utility vehicle is provided with a relatively large cargo bed in a rear section of a seat in comparison to a handlebar style utility vehicle belonging to an all terrain vehicle. Therefore, the pick-up style utility vehicle is used in wider practical fields of uses such as transport in golf links, maintenance of the golf links, hunting and conveyance of wood materials in comparison to the handlebar style utility vehicle.

The applicant previously filed applications for the inventions relating to a pick-up style utility vehicle with an expandable cargo bed, and those applications were patented. For example, the inventions include U.S. Pat. No. 6,905,159, U.S. Pat. No. 6,994,388, and U.S. Pat. No. 7,249,798.

FIG. 17 shows a pick-up style utility vehicle 901 as shown in the patent literatures described above. The pick-up style utility vehicle 901 is provided with a front seat 902, a rear seat 903, and a cargo bed CN. The cargo bed CN includes a stationary bottom plate 907 and a plate portion 904 arranged on the stationary bottom plate 907. The pick-up style utility vehicle 901 is switchable between a normal state in which the vehicle is used as a four-seater vehicle and an expanded state in which the vehicle is used as a two-seater vehicle with an expanded cargo bed. A screen 905 is arranged on the stationary bottom plate 907 between the plate portion 904 and the rear seat 903.

FIG. 18 is a side view showing the pick-up style utility vehicle 901 in the normal state. In the normal state, passengers can sit in both the front seat 902 and the rear seat 903. The rear seat 903 is supported pivotably on a horizontal shaft 935 provided in a front end of the rear seat 903. FIG. 18 shows the rear seat 903 at a use position P1 and the cargo bed CN in the normal state. The "rear seat 903 at the use position P1" indicates the seat 903 placed on the stationary bottom plate 907.

FIG. 19 is a side view showing the pick-up style utility vehicle 901 in the expanded state. In the expanded state, the rear seat 903 is at a shunting position P2. The rear seat 903 at the shunting position P2 stands up on the front side of the stationary bottom plate 907. Therefore, the passengers cannot sit on the rear seat 903 at the shunting position P2. Meanwhile, since the rear seat 903 is shunted to the front side of the stationary bottom plate 907, the entire face of the stationary bottom plate 907 is cleared. Therefore, a cargo bed CE in the expanded state can be extended further than the cargo bed CN in the normal state.

The normal state is changed to the expanded state as follows. Firstly, the rear seat 903, which is pivotable on the horizontal shaft 935, is folded down forward from the use position P1 to the shunting position P2. Then, in accordance with the positional change of the rear seat 903, a position of the screen 905 is changed to the front side. As a result, a front part of the stationary bottom plate 907 is also cleared. Therefore, the entire face of the stationary bottom plate 907 is usable as a bottom face of the cargo bed. Expansion side plates 943, accommodated in the cargo bed CN, are rotated to the front side. In such a way, the cargo bed CE in the expanded state is formed.

FIG. 20 shows an example of the screen 905. The screen 905 is formed of a steel frame and wire mesh. Therefore, the screen 905 is a heavy member. The screen 905 is supported on a chassis by inserting protruding portions 905a, 905a of the screen 905 into attachment holes arranged in both ends of the chassis in the right and left direction. That is, there is a need to lift the screen 905 up in order to move the screen 905. Therefore, the positional change of the screen 905 requires two persons and is not easily performed by one person.

Conventionally, in the pick-up style utility vehicle, a layout change for the cargo bed requires steps of: (a) moving the rear seat; (b) moving the expansion side plates; and (c) moving the screen. Therefore, the layout change is bothersome work. In a case where the rear seat is used, space for the cargo bed is reduced by the layout change.

SUMMARY OF THE INVENTION

The present invention has been developed in consideration of the above-described problems, and an object of the present invention is to easily perform a layout change for a cargo bed without changing space for the cargo bed.

A first aspect of the invention is a pick-up style utility vehicle having a front seat and a rear seat. The pick-up style utility vehicle includes a cargo bed movement mechanism for supporting a cargo bed movably within a predetermined movement range in the back and forth direction.

According to the first aspect of the invention, the layout change for the cargo bed requires the steps of: (a) moving the rear seat; and (b) moving the cargo bed. Therefore, bothersome work of changing the layout is reduced. Space for the cargo bed is unchanged by the layout change.

Configurations (1) to (6) may be adapted for the pick-up style utility vehicle of the first aspect of the invention.

In configuration (1), a seat movement mechanism for supporting the rear seat movably between a use position set to be within the movement range and a shunting position set to be out of the movement range is provided.

In configuration (2), the cargo bed movement mechanism has a first engagement member supported on a chassis and a second engagement member supported on the cargo bed. The first engagement member and the second engagement member are engaged with each other, and the pick-up style utility vehicle further includes a rotary support mechanism for supporting the cargo bed pivotably on a horizontal shaft in the right and left direction relative to the second engagement member.

In configuration (3), the shunting position is provided on the lower side of the movement range, i.e. below the level of the cargo bed.

In configuration (4), a seating face of the rear seat is arranged on the lower side of the movement range, i.e. below the level of the cargo bed, in order to prevent abutment between the rear seat and the cargo bed.

According to the configuration (4), the layout change for the cargo bed does not require the step of (a) moving the rear seat. The layout change for the cargo bed only requires the step of moving the cargo bed. Therefore, the bothersome work of changing the layout is further reduced.

In configuration (5), a seat support mechanism for supporting the rear seat on the cargo bed is provided, the front seat is provided with a storage space or area for partially storing the rear seat, and the rear seat, which is moved together with the cargo bed, is stored in the storage space.

In configuration (6), the seat support mechanism is capable of coupling and separating the cargo bed and the rear seat.

DETAILED DESCRIPTION OF THE PREFERRED EMBODIMENTS

First Embodiment

Figure 1:
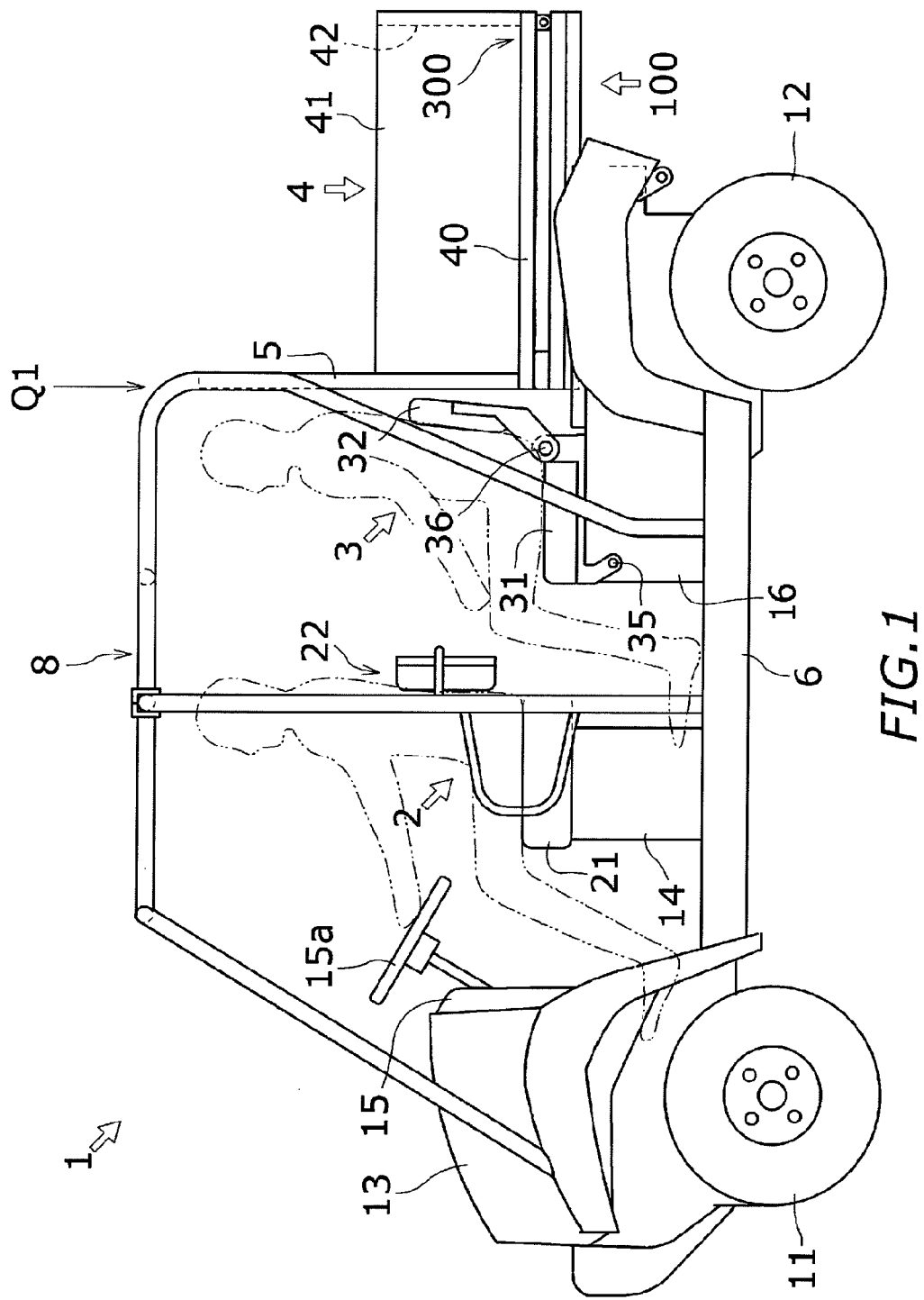
FIG. 1 is a side view showing a pick-up style utility vehicle (a first embodiment)
Figure 2:
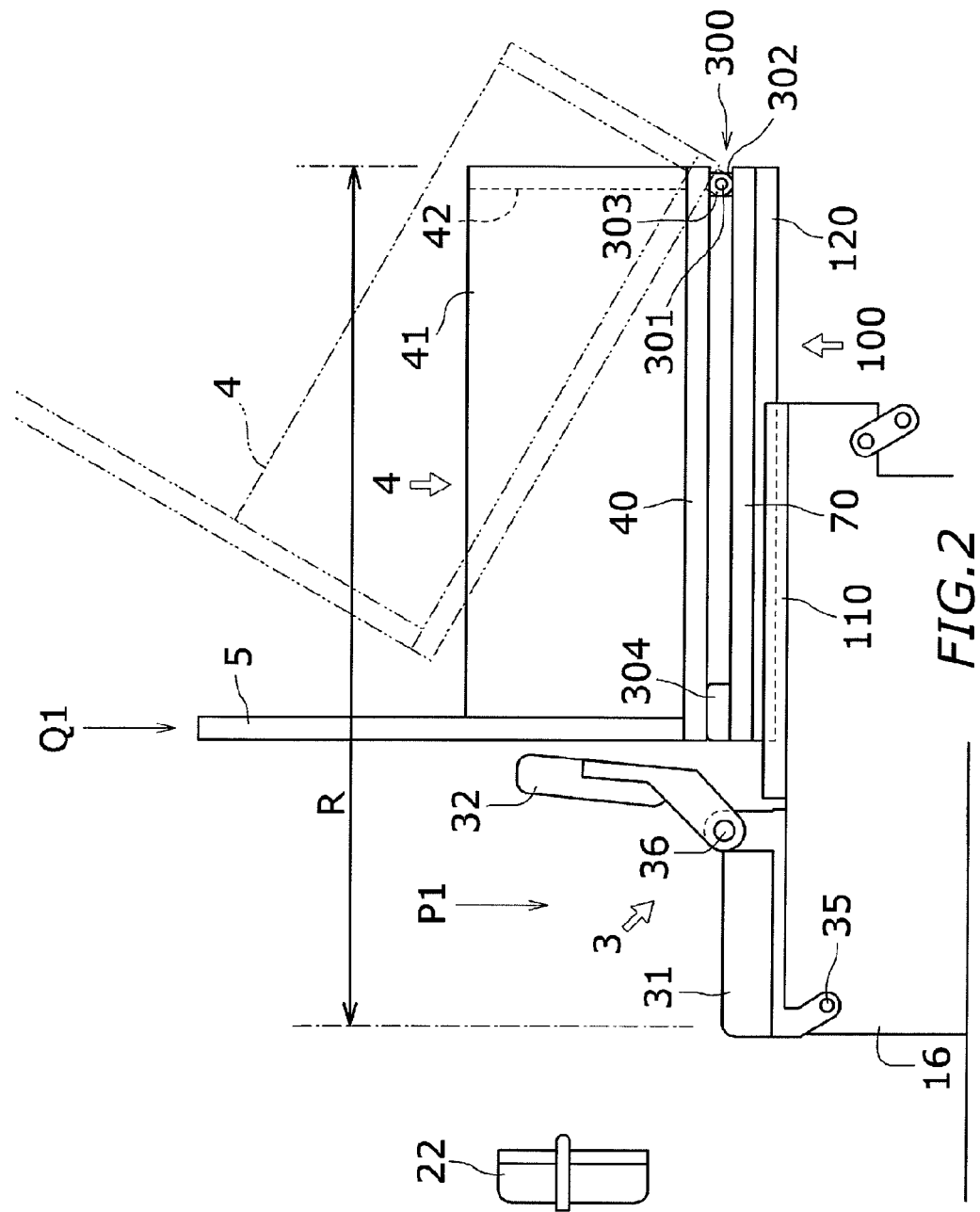
FIG. 2 is a side view showing a cargo bed at a rear position (the first embodiment)
Figure 3:
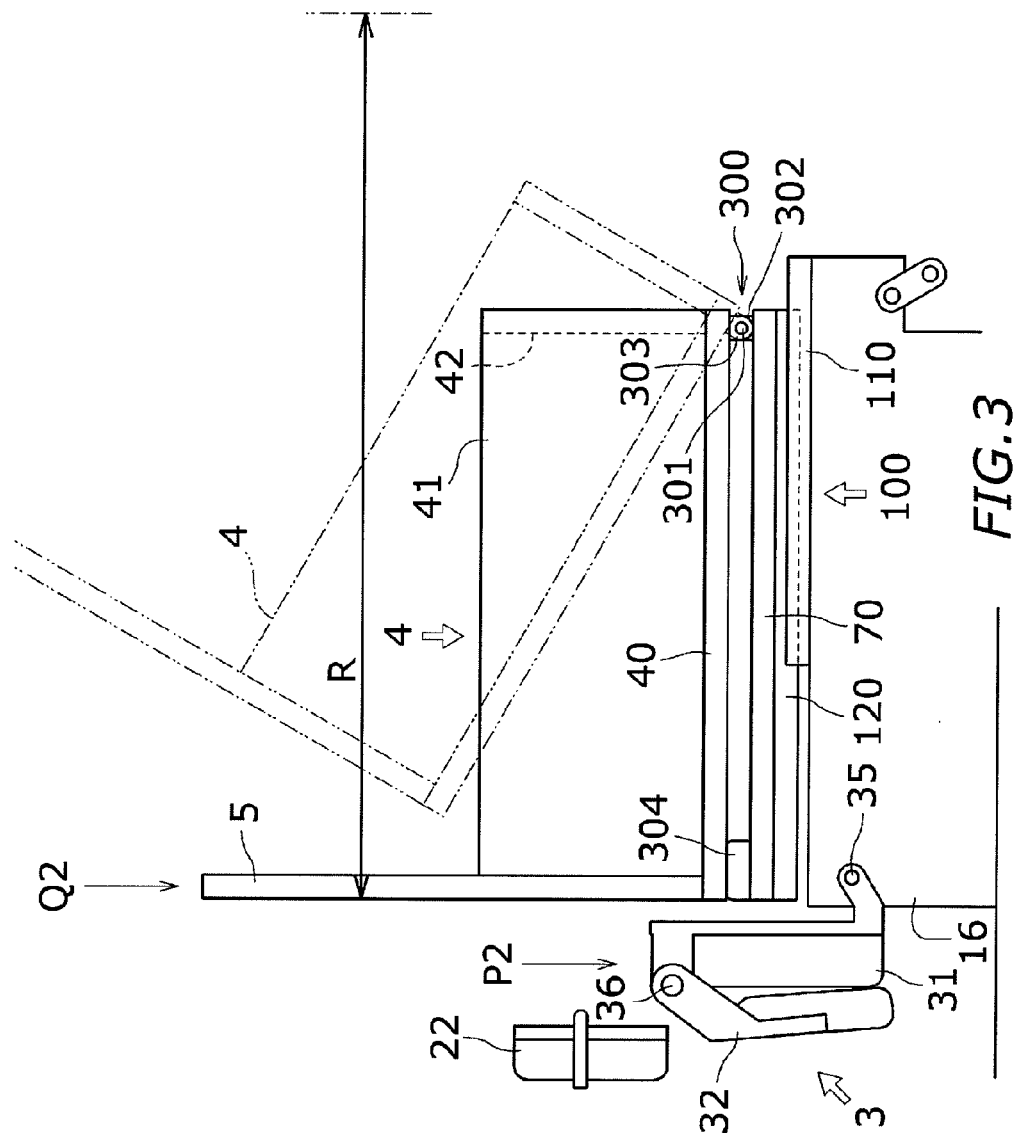
FIG. 3 is a side view showing the cargo bed at a front position (the first embodiment)

In a pick-up style utility vehicle 1, the layout of a cargo bed 4 is changeable between a rear position Q1 and a front position Q2. In FIGS. 1 and 2, the cargo bed 4 is at the rear position Q1. In FIG. 3, the cargo bed 4 is at the front position Q2. Hereinafter, a configuration of this pick-up style utility vehicle will be described in detail based on the drawings.

FIG. 1 is a side view showing the pick-up style utility vehicle 1. The pick-up style utility vehicle 1 includes a chassis 6 provided with a pair of right and left front wheels 11 and a pair of right and left rear wheels 12. A hood 13, a front support stand 14, and a rear support stand 16 are arranged on the chassis 6 in this order from the front side to the rear side. A dashboard (an operation portion) 15 provided with a steering wheel 15a and the like is arranged in a rear part of the hood 13. A front seat 2 is arranged on the upper side of the front support stand 14. A rear seat 3 and the cargo bed 4 are arranged on the upper side of the rear support stand 16. The cargo bed 4 includes a screen 5. A cabin frame 8 is arranged so as to surround the dashboard 15, the front seat 2, and the rear seat 3. The cabin frame 8 is fixed to the chassis 6. A cabin is formed in the interior surrounded by the chassis 6 and the cabin frame 8.

The front seat 2 and the rear seat 3 are formed in a bench shape elongated in the right and left direction. In the present embodiment, a plurality of passengers can sit side by side in both the front seat 2 and the rear seat 3.

In FIG. 1, the front seat 2 is provided with a front main seat 21 and a front backrest 22. The front main seat 21 is fixed to the front support stand 14. The front backrest 22 is fixed to the cabin frame 8.

In FIG. 1, the rear seat 3 is provided with a main seat 31, a backrest 32, and a horizontal shaft 36. A lower end of the backrest is supported on the main seat 31 pivotably on the horizontal shaft 36. The horizontal shaft 36 is a shaft extending in the right and left direction. The main seat 31 is supported on the rear support stand 16 pivotably on a horizontal shaft 35.

In FIG. 1, the cargo bed 4 is a box formed by opening an upper face of a hexahedron. The cargo bed 4 includes a bottom plate 40 serving as a bottom face, two side plates 41 serving as both side faces, a rear plate 42 serving as a rear face, and the screen 5 serving as a front face. The two side plates 41 and the screen 5 are fixed to the bottom plate 40. The rear plate 42 is supported on the two side plates 41 pivotably on a horizontal shaft so as to open the rear face of the cargo bed.

In the FIG. 1, the pick-up style utility vehicle 1 is provided with a cargo bed movement mechanism 100 for slidably supporting the cargo bed 4 within a movement range R in the back and forth direction. The cargo bed movement mechanism 100 is arranged between the rear support stand 16 and the cargo bed 4 in the vertical direction.

FIG. 2 is a side view showing the cargo bed 4 at the rear position. In FIG. 2, the cargo bed movement mechanism 100 is provided with a first rail (a first engagement member) 110 and a second rail (a second engagement member) 120. The first rail 110 and the second rail 120 are formed so as to be engaged with each other. As a result, the second rail 120 is movable in the back and forth direction within the movement range R relative to the first rail 110. The first rail 110 is fixed to the rear support stand 16 (the chassis 6). The second rail 120 is fixed to a bottom face of a support plate 70. The second rail 120 is supported on the bottom plate 40 (the cargo bed 4) via the support plate 70 and a rotary support mechanism 300.

The movement range R indicates space through which the cargo bed 4 and accessory members of the cargo bed 4 are capable of passing. The accessory members of the cargo bed 4 indicate members which are moved together with the cargo bed 4. The second rail 120 and the support plate 70 are included in the accessory members of the cargo bed 4. The cargo bed 4 is movable between the front position Q2 which is the most front side and the rear position Q1 which is the most rear side within the movement range R. The front position Q2 is shown in FIG. 3. The rear position Q1 is shown in FIGS. 1 and 2.

In FIG. 2, the pick-up style utility vehicle 1 is provided with the rotary support mechanism 300 for dumping. The rotary support mechanism 300 supports the cargo bed 4 pivotably on a horizontal shaft 301 relative to the second rail 120. The horizontal shaft 301 is a shaft extending in the right and left direction. The horizontal shaft 301 is rotatably provided in a bracket 302 fixed to a rear end of the support plate 70 and a bracket 303 fixed to a rear end of the bottom plate 40. A support base 304 is fixed to a front end of the support plate 70. The support base 304 supports a front end of the cargo bed 4. The passengers can tilt the cargo bed 4 on the horizontal shaft 301 by lifting the front end of the cargo bed 4 upward. In FIG. 2, the tilted cargo bed 4 (the cargo bed 4 in a dumping state) is shown by a double chain line.

A damper mechanism is preferably provided between the cargo bed 4 and the support plate 70. The damper mechanism prevents fast pivoting of the cargo bed 4 so as to maintain slow pivoting speed of the cargo bed 4. In this case, there is no need for providing a stopper mechanism in order to suppress the pivoting of the cargo bed 4.

The pick-up style utility vehicle 1 is provided with a seat movement mechanism for supporting the rear seat 3 movably between a use position P1 and a shunting position P2. The seat movement mechanism includes the horizontal shaft 35 described above. The use position P1 is shown in FIGS. 1 and 2. The passengers can sit in the seat 3 at the use position P1.

In FIG. 2, the rear seat 3 is at the use position P1, and the cargo bed 4 is at the rear position Q1. The use position P1 is set to be within the movement range R of the cargo bed 4.

FIG. 3 is a side view showing the cargo bed 4 at the front position Q2. In FIG. 3, the rear seat 3 is at the shunting position P2, and the cargo bed 4 is at the front position Q2. The shunting position P2 is a position for preventing abutment between the rear seat 3 and the cargo bed 4. Therefore, the shunting position P2 is set to be out of the movement range R of the cargo bed 4. In the first embodiment, the shunting position P2 is set on the front side of the movement range R.

With reference to FIGS. 2 and 3, a layout change for the cargo bed 4 will be described. The layout change from the rear position Q1 to the front position Q2 is performed as follows. In FIG. 2, the passengers fold the backrest 32 down to the main seat 31 in order to make the rear seat 3 compact. Then, the passengers move the rear seat 3 from the use position P1 to the shunting position P2. Front space within the movement range R is cleared due to the shunt of the rear seat 3. Next, the passengers move the cargo bed 4 from the rear position Q1 to the front position Q2. In such a way, the layout change from the rear position Q1 to the front position Q2 is completed as shown in FIG. 3. A layout change from the front position Q2 to the rear position Q1 is performed by reverse procedure to the layout change from the rear position Q1 to the front position Q2.

That is, in the first embodiment, the layout change for the cargo bed 4 requires steps of: (a) moving the rear seat 3; and (d) moving the cargo bed 4. However, the layout change does not require steps of: (b) moving expansion side plates; and (c) moving the screen. Therefore, the bothersome work of changing the layout is reduced. In step (d), the entire cargo bed 4 is moved. Therefore, space for the cargo bed is unchanged by the layout change.

Second Embodiment

Figure 4:
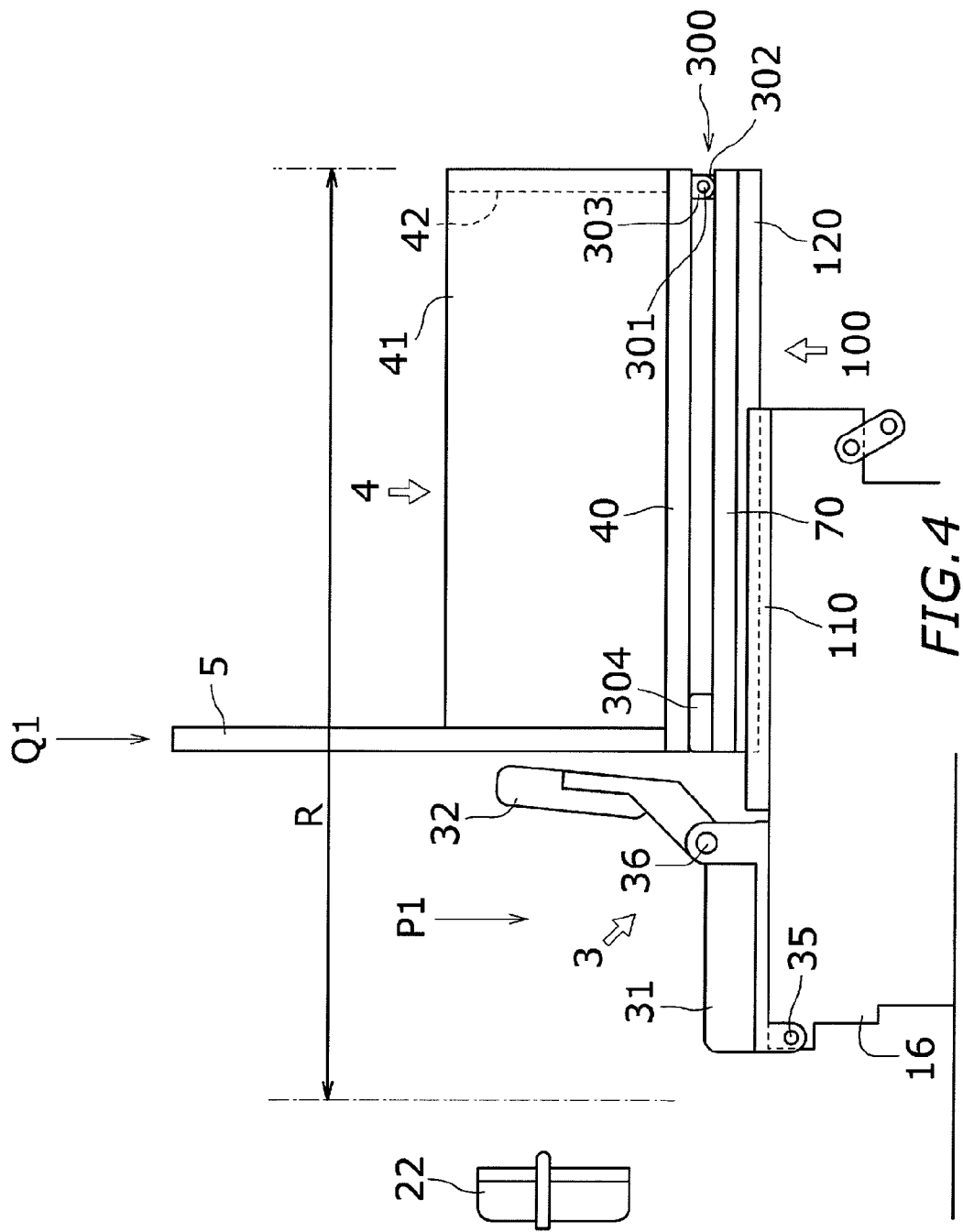
FIG. 4 is a side view showing the cargo bed at the rear position (a second embodiment)
Figure 5:
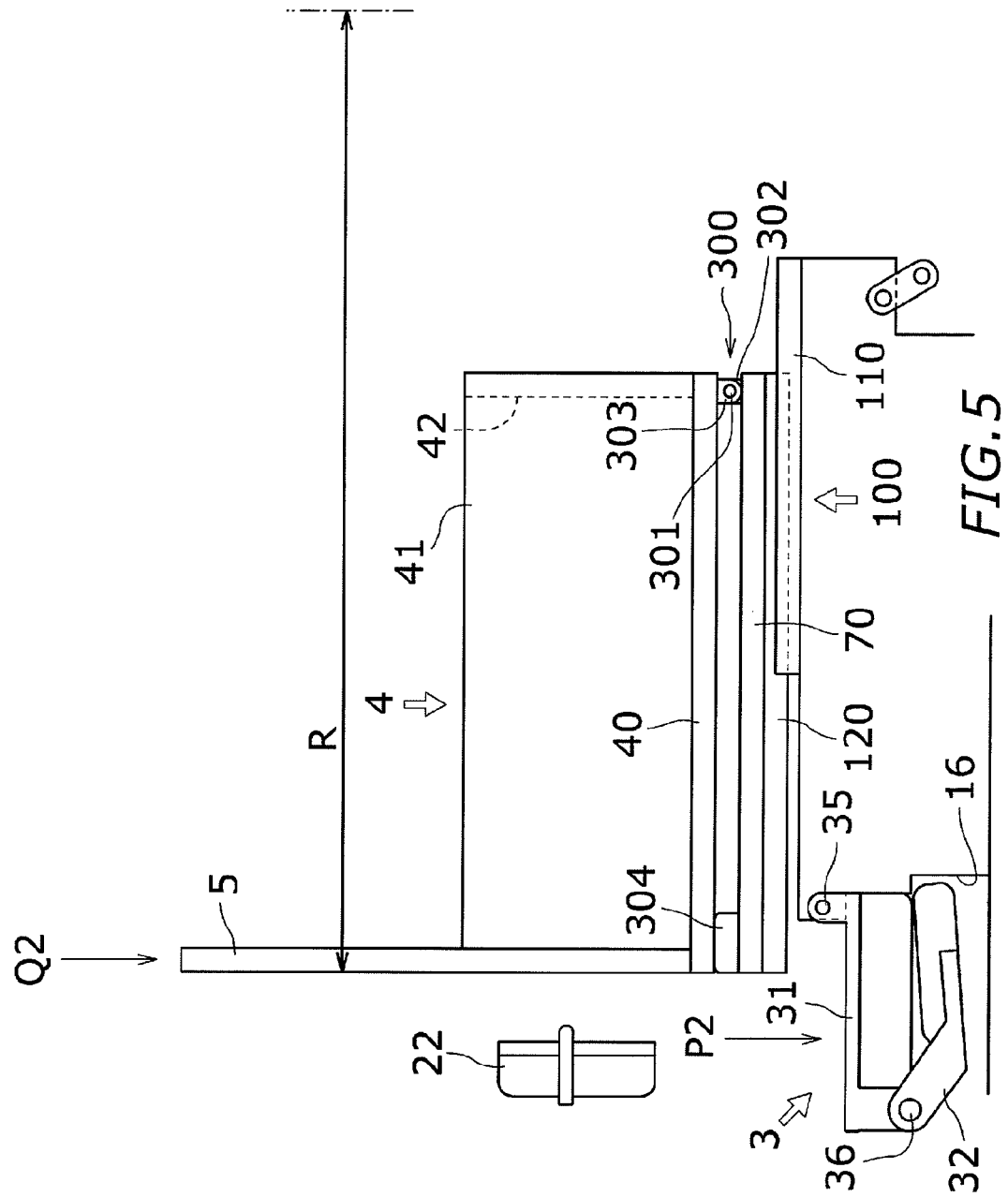
FIG. 5 is a side view showing the cargo bed at the front position (the second embodiment)

FIGS. 4 and 5 show the pick-up style utility vehicle 1 in a second embodiment. The second embodiment is the same as the first embodiment except a difference in terms of the rear seat 3 at the shunting position P2. In the second embodiment, parts which are common to the first embodiment will be identified with the same reference numerals.

FIG. 4 is a side view showing the cargo bed 4 at the rear position Q1. In FIG. 4, the rear seat 3 is at the use position P1, and the cargo bed 4 is at the rear position Q1.

FIG. 5 is a side view showing the cargo bed 4 at the front position Q2. In FIG. 5, the rear seat 3 is at the shunting position P2, and the cargo bed 4 is at the front position Q2. In the second embodiment, the shunting position P2 of the rear seat 3 is provided on the lower side of the movement range R of the cargo bed 4.

With regard to the rear seat 3, the change from the use position P1 to the shunting position P2 is performed as well as the first embodiment. That is, the passengers firstly fold the backrest 32 down to the main seat 31 in order to make the rear seat 3 compact. Then, the passengers move the rear seat 3 from the use position P1 to the shunting position P2.

In the second embodiment, the rear seat 3 is shunted to the lower side of the movement range R. Thus, the cargo bed 4 can be moved forward until the cargo bed 4 comes into contact with the front seat 2.

Third Embodiment

Figure 6:
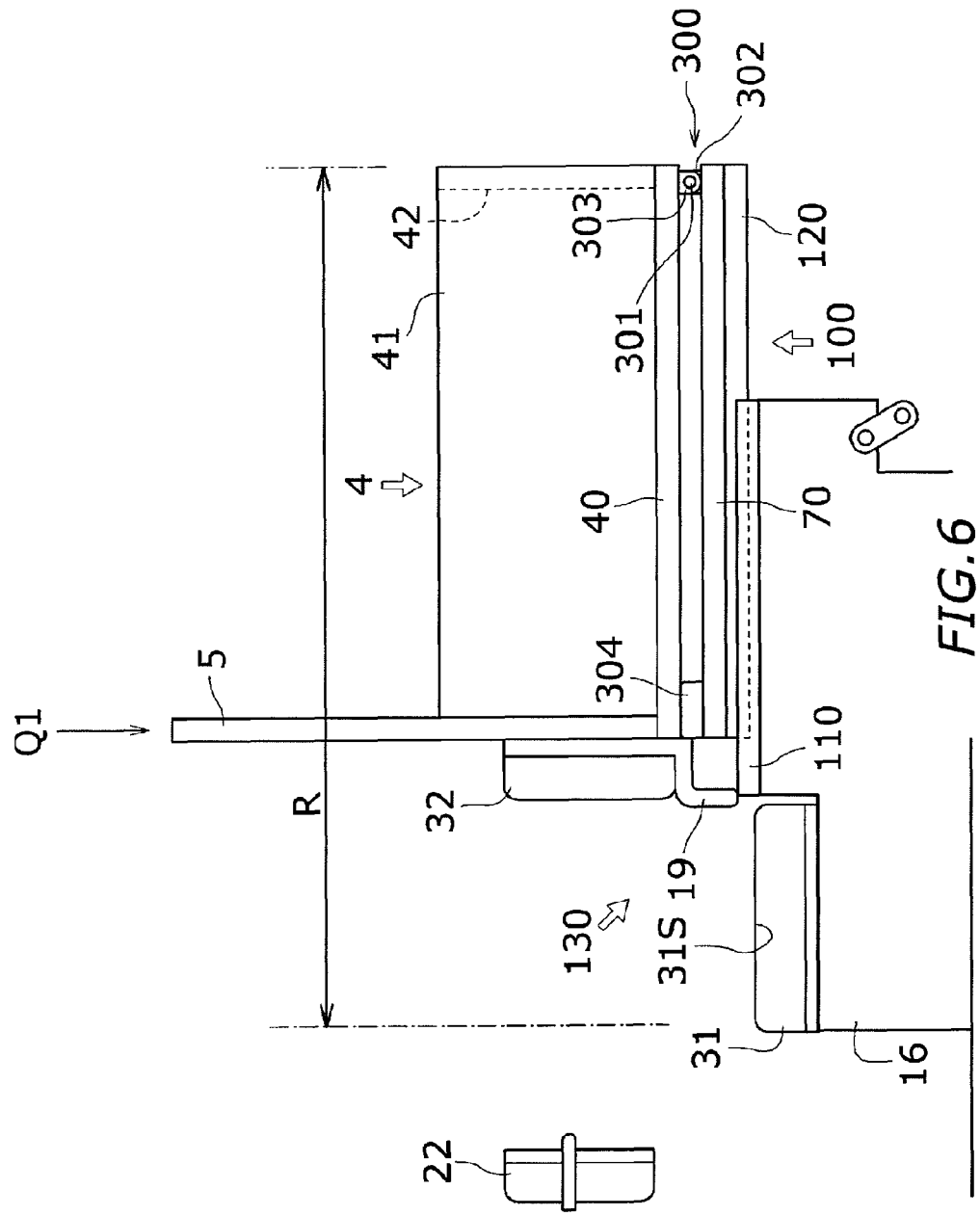
FIG. 6 is a side view showing the cargo bed at the rear position (a third embodiment)
Figure 7:
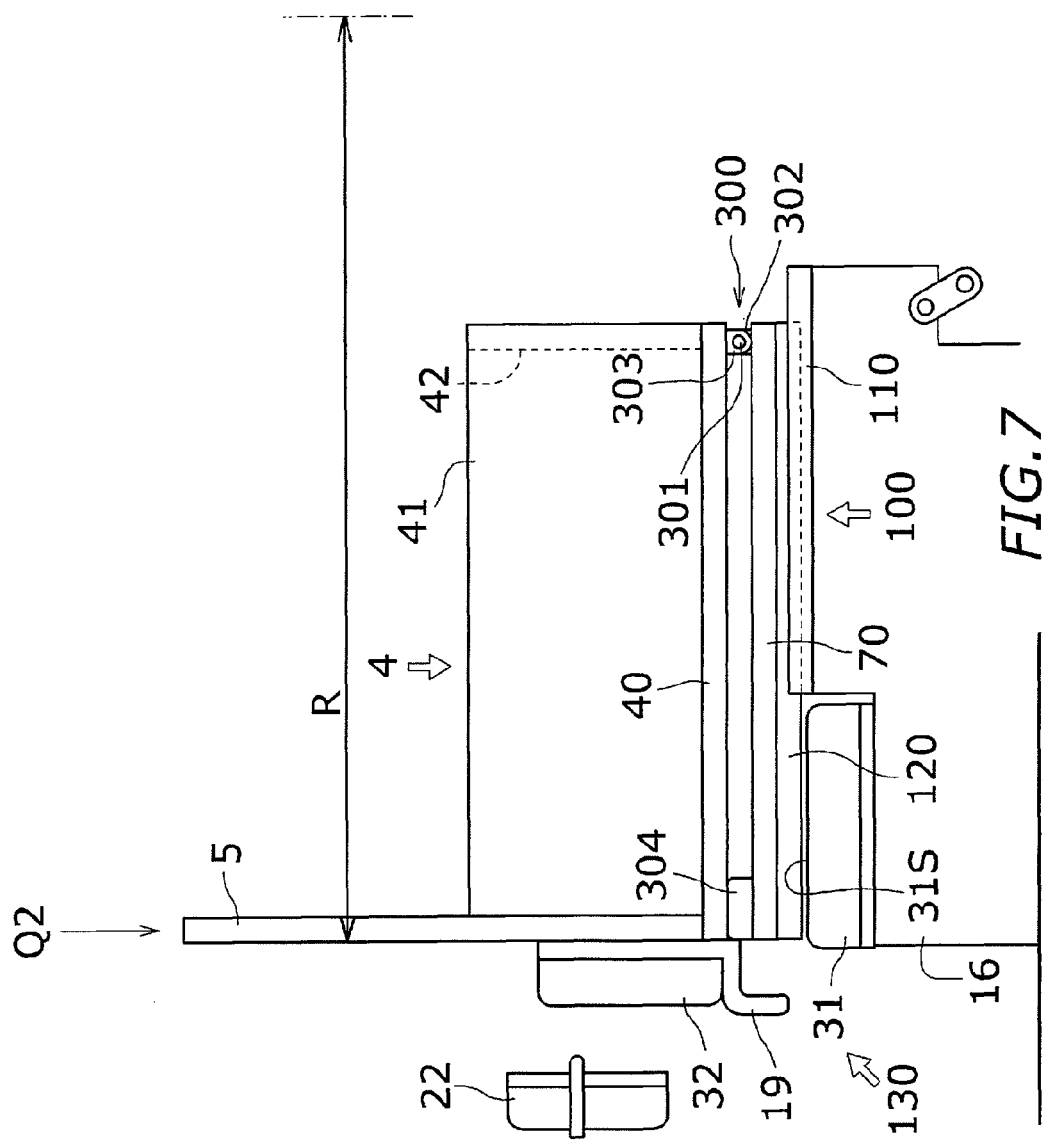
FIG. 7 is a side view showing the cargo bed at the front position (the third embodiment)

FIGS. 6 and 7 show the pick-up style utility vehicle 1 in a third embodiment. The third embodiment is the same as the first embodiment except the following differences. In the third embodiment, a rear seat 130 is provided in the third embodiment instead of the rear seat 3 in the first embodiment. The seat movement mechanism (the horizontal shaft 35) in the first embodiment is not provided in the third embodiment. In the third embodiment, parts which are common to the first embodiment will be identified with the same reference numerals.

FIG. 6 is a side view showing the cargo bed 4 at the rear position. In the third embodiment, the rear seat 130 is provided instead of the rear seat 3. The rear seat 130 is also provided with the main seat 31 and the backrest 32. However, the main seat 31 and the backrest 32 are separated from each other in the rear seat 130. The main seat 31 is fixed to the rear support stand 16. The backrest 32 is fixed to the cargo bed 4 via a supplementary screen 19.

In FIG. 6, a seating face 31S indicates an upper face of the main seat 31. The seating face 31S is a part on which the passengers place their buttocks. The seating face 31S is arranged on the lower side of the movement range R of the cargo bed 4 in order to prevent abutment between the rear seat 130 and the cargo bed 4. More specifically, the seating face 31S is arranged on the lower side of the second rail 120. Therefore, the main seat 31 is not related to the position of the cargo bed 4 and also not abutted with the cargo bed 4.

In FIG. 6, the cargo bed 4 is at the rear position Q1. At this time, the backrest 32 is positioned immediately behind the main seat 31. Here, the passengers can sit in the rear seat 130.

FIG. 7 is a side view showing the cargo bed 4 at the front position Q2. At this time, the backrest 32 of the rear seat 130 is positioned immediately behind the backrest 22 of the front seat 2.

In the third embodiment, the layout change for the cargo bed 4 does not require the step of (a) moving the rear seat. The layout change for the cargo bed 4 only requires the step of (d) moving the cargo bed 4. Therefore, the bothersome work of changing the layout is even further reduced.

Fourth Embodiment

Figure 8:
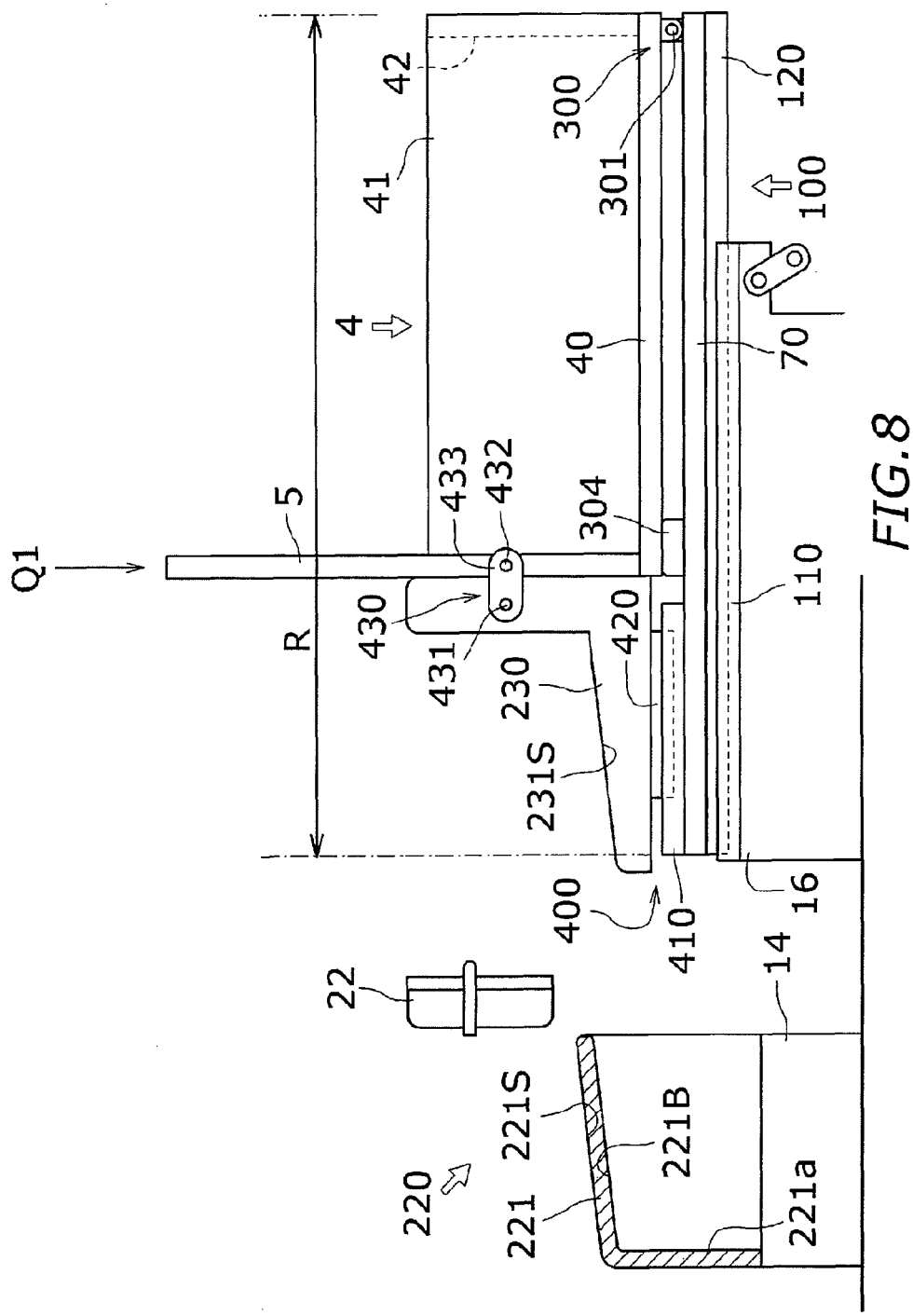
FIG. 8 is a side view showing the cargo bed at the rear position (a fourth embodiment)
Figure 9:
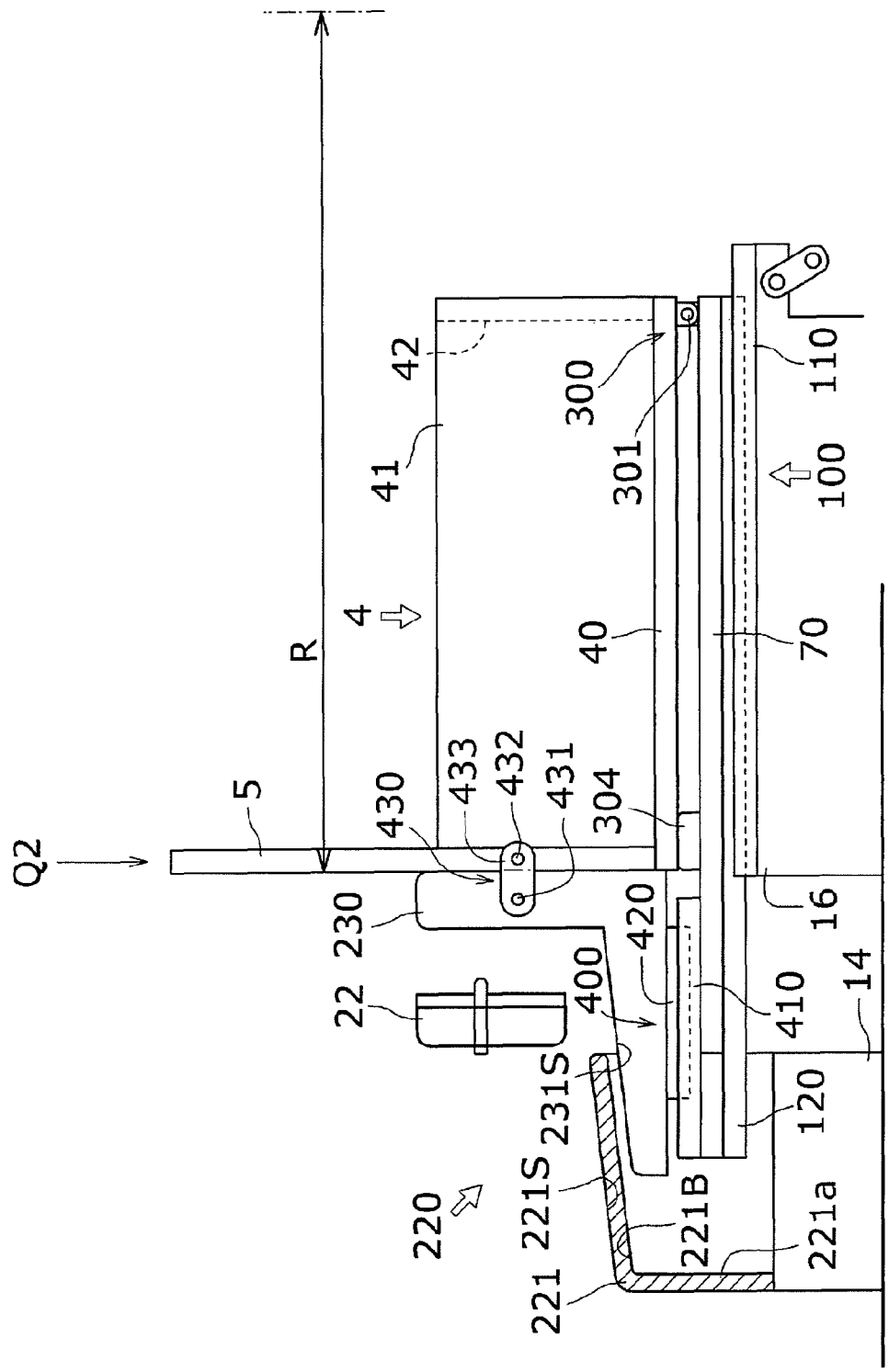
FIG. 9 is a side view showing the cargo bed at the front position (the fourth embodiment)

FIGS. 8 and 9 show the pick-up style utility vehicle 1 in a fourth embodiment. The fourth embodiment is the same as the first embodiment except the following differences. A front seat 220 and a rear seat 230 are provided in the fourth embodiment instead of the front seat 2 and the rear seat 3 in the first embodiment. The seat movement mechanism (the horizontal shaft 35) in the first embodiment is not provided in the fourth embodiment. Meanwhile, a seat support mechanism is provided in the fourth embodiment. In the fourth embodiment, parts which are common to the first embodiment will be identified with the same reference numerals.

FIG. 8 is a side view showing the cargo bed 4 at the rear position Q1. In the fourth embodiment, the front seat 220 is provided with a front main seat 221 and the front backrest 22. The rear seat 230 is an integral body formed by integrating a main seat (a seating face part) and a backrest.

The seat support mechanism supports the rear seat 230 onto the cargo bed 4. The seat support mechanism includes a seat movement mechanism 400 and a lock mechanism 430. The seat movement mechanism 400 supports the rear seat 230 movably in the back and forth direction. The lock mechanism 430 can lock the movable rear seat 230.

The seat movement mechanism 400 includes a first seat rail 410 and a second seat rail 420. The first seat rail 410 is fixed to an upper face of the support plate 70. The second seat rail 420 is fixed to a bottom face of the rear seat 230. The first seat rail 410 and the second seat rail 420 are formed so as to be engaged with each other. As a result, the rear seat 230 is movable in the back and forth direction along the first seat rail 410. The rear seat 230 is supported on the support plate (the cargo bed 4).

The lock mechanism 430 is capable of coupling and separating the rear seat 230 and the cargo bed 4. The lock mechanism 430 includes an engagement pin 431, an engagement pin 432, and a hook 433, for example. The engagement pin 431 is fixed to the rear seat 230. The engagement pin 432 is fixed to the screen 5. The hook 433 is attachable to and detachable from both the engagement pin 431 and the engagement pin 432. The rear seat 230 and the cargo bed 4 are coupled to each other by attaching the hook 433 to both the pins 431 and 432.

In FIG. 8, the cargo bed 4 is at the rear position Q1. At this time, the front seat 220 and the rear seat 230 are spaced out by predetermined width. Here, the passengers can sit in the rear seat 230.

FIG. 9 is a side view showing the cargo bed 4 at the front position Q2. In FIG. 9, the rear seat 230 and the cargo bed 4 are moved to the front side of the rear position Q1. At this time, the rear seat 230 overlaps with the front seat 220 in the vertical direction.

The front seat 220 is provided with a storage space for partially storing the rear seat 230. The rear seat 230 moved together with the cargo bed 4 can come into the storage space of the front seat 220. The storage space is formed on the lower side of the front main seat 221. More specifically, the storage space includes the front main seat 221, the front support stand 14, and a leg portion 221a. The leg portion 221a is a part of the front main seat 221 protruding downward at a front end of a seating face 221S. The leg portion 221a is fixed to the front support stand 14.

A seating face 231S of the rear seat 230 is arranged in parallel to a bottom face 221B of the front main seat 221. The bottom face 221B is a face positioned on the opposite side of the seating face 221S in the front main seat 221. The seating face 231S and the bottom face 221B are parallel to each other and tilted relative to a horizontal plane. Therefore, the rear seat 230 can be stored in the front seat 220 while the height of the seating face 221S is substantially the same as the height of the seating face 231S. Particularly, the rear seat 230 can be moved toward the front seat 220 until the bottom face 221B comes into contact with the seating face 231S.

Figure 10:
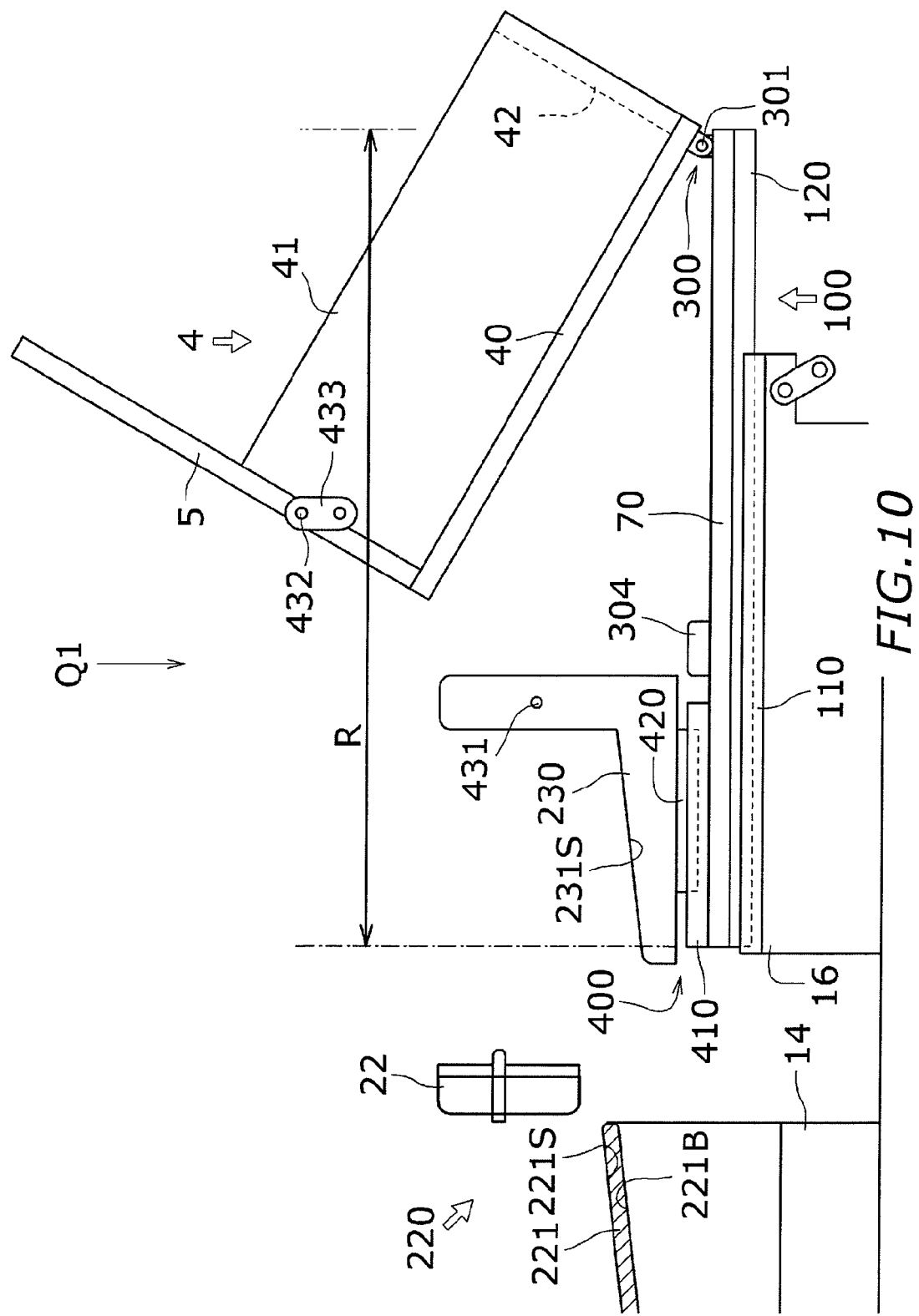
FIG. 10 is a side view showing the cargo bed in a dumping state at the rear position (the fourth embodiment)

FIG. 10 is a side view showing the cargo bed 4 in a dumping state at the rear position Q1. The rotary support mechanism 300 is also provided in the fourth embodiment. Therefore, the cargo bed 4 can be tilted on the horizontal shaft 301 in the fourth embodiment. The passengers release the coupling made by the lock mechanism 430 in advance of the tilt of the cargo bed 4. When the coupling between the cargo bed 4 and the rear seat 230 is released, the pivoting of the cargo bed 4 can be performed. It should be noted that the cargo bed 4 can be tilted not only when the cargo bed 4 is at the rear position Q1 but also when the cargo bed 4 is at the front position Q2.

The rear seat 230 can be moved by the seat movement mechanism 400 relative to the support plate 70. When the rear seat 230 is moved forward upon tilting the cargo bed 4, the abutment between the rear seat 230 and the cargo bed 4 can be surely prevented.

Fifth Embodiment

Figure 11:
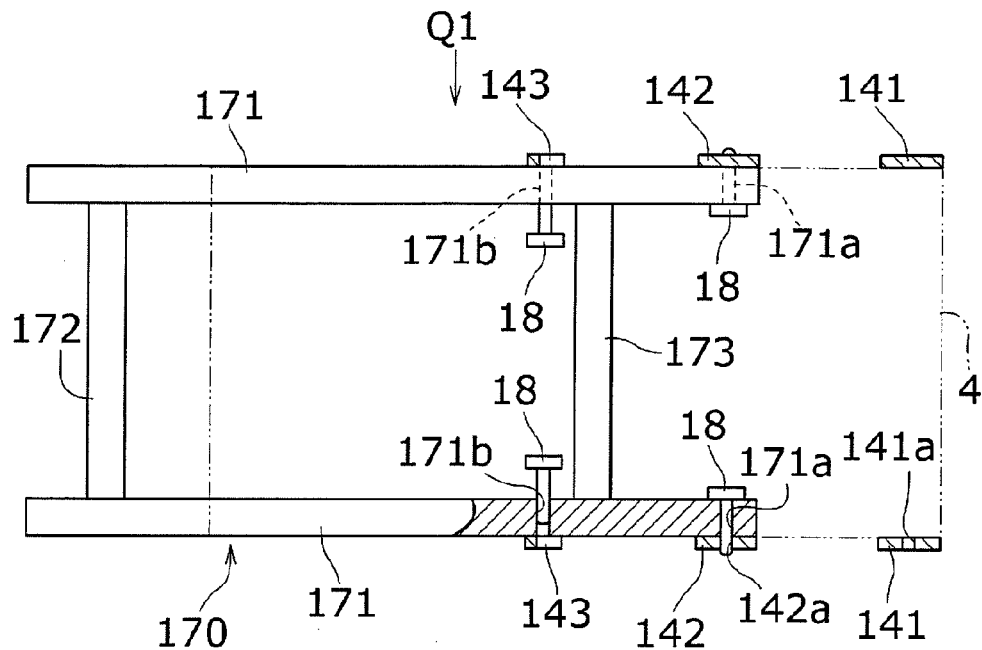
FIG. 11 is a plan view showing the cargo bed and a support portion at the rear position (a fifth embodiment)
Figure 12:
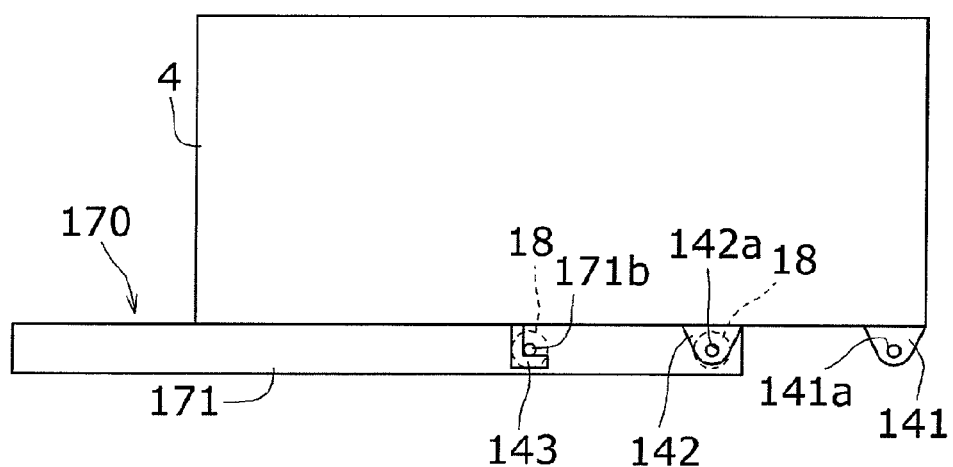
FIG. 12 is a side view showing the cargo bed and the support portion at the rear position (the fifth embodiment)

FIGS. 11 and 12 show the pick-up style utility vehicle 1 in a fifth embodiment. The fifth embodiment is different from the first embodiment in terms of a configuration of a cargo movement mechanism. In the fifth embodiment, parts which are common to the first embodiment will be identified with the same reference numerals.

FIG. 11 is a plan view showing the cargo bed 4 and a support portion 170 at the rear position Q1. The support portion 170 includes two support poles 171, 171 and two connection poles 172, 173. The support poles 171 expand in the back and forth direction. The two support poles 171, 171 are arranged in parallel to each other. The two connection poles 172, 173 connect the two support poles 171, 171.

FIG. 12 is a side view showing the cargo bed 4 and the support portion 170 at the rear position Q1. The cargo bed 4 is arranged on the support portion 170. The cargo bed 4 is movable in the back and forth direction relative to the support portion 170. The cargo bed 4 is provided with four brackets at a rear end of the cargo bed 4. The four brackets include two front brackets 142 and two rear brackets 141. The front brackets 142 are arranged on the front side of the rear brackets 141. The four brackets 141 and 142 are arranged on the outer side of the support portion 170 in the right and left direction. The cargo bed 4 is not dropped from the support portion 170 due to the four brackets 141 and 142.

The cargo bed 4 is supported on the support portion 170 by two or four pins 18 at the rear position Q1 and the front position Q2. The support portion 170 has two first holes 171a and two second holes 171b into which the pins 18 are inserted. The first holes 171a and the second holes 171b are formed at rear ends of the support poles 171. The second holes 171b are formed on the front side of the first holes 171a. Meanwhile, the cargo bed 4 has front holes 142a and rear holes 141a into which the pins 18 are inserted, and engagement brackets 143 to be engaged with the pins 18. The front holes 142a are formed in the front brackets 142, and the rear holes 141a are formed in the rear brackets 141. The engagement brackets 143 are formed in an L shape seen from the side, and respectively have vertical sides and bases. The engagement brackets 143 are placed on the front side of the front brackets 142.

The cargo bed 4 is tiltably supported on the support portion 170 by respectively pushing the pins 18 into the two first holes 171a. The pins 18 are pushed from the inside of the support portion 170 to the outside. In FIG. 11, the cargo bed 4 is at the rear position Q1. At this time, the first holes 171a of the first poles 171 overlap with the front holes 142a of the front brackets 142 seen from the side. The pins 18 are inserted into the front holes 142a by pushing the pins 18 into the first holes 171a on the right and left sides. As a result, the pins 18 pushed into the first holes 171a function as pivot shafts for the cargo bed 4. At this time, the cargo bed 4 can be pivoted on the pins 18 relative to the support portion 170. It should be noted that the pins 18 inserted into the second holes 171b do not project to the outside of the support poles 171 but stay inside the support poles 171.

The cargo bed 4 is non-tiltably supported on the support portion 170 by respectively pushing the pins 18 into the two first holes 171a and the two second holes 171b. When the cargo bed 4 is at the rear position Q1, the second holes 171b of the support poles 171 substantially overlap with the engagement brackets 143. The pins 18 are engaged with the engagement brackets 143 by pushing the pins 18 into the second holes 171b on the right and left sides. As a result, the pins 18 pushed into the second holes 171b function as a lock mechanism for the cargo bed 4. At this time, the cargo bed 4 cannot be pivoted. It should be noted that the lock of the cargo bed 4 is released by pulling the pins 18 to the inside.

Figure 13:
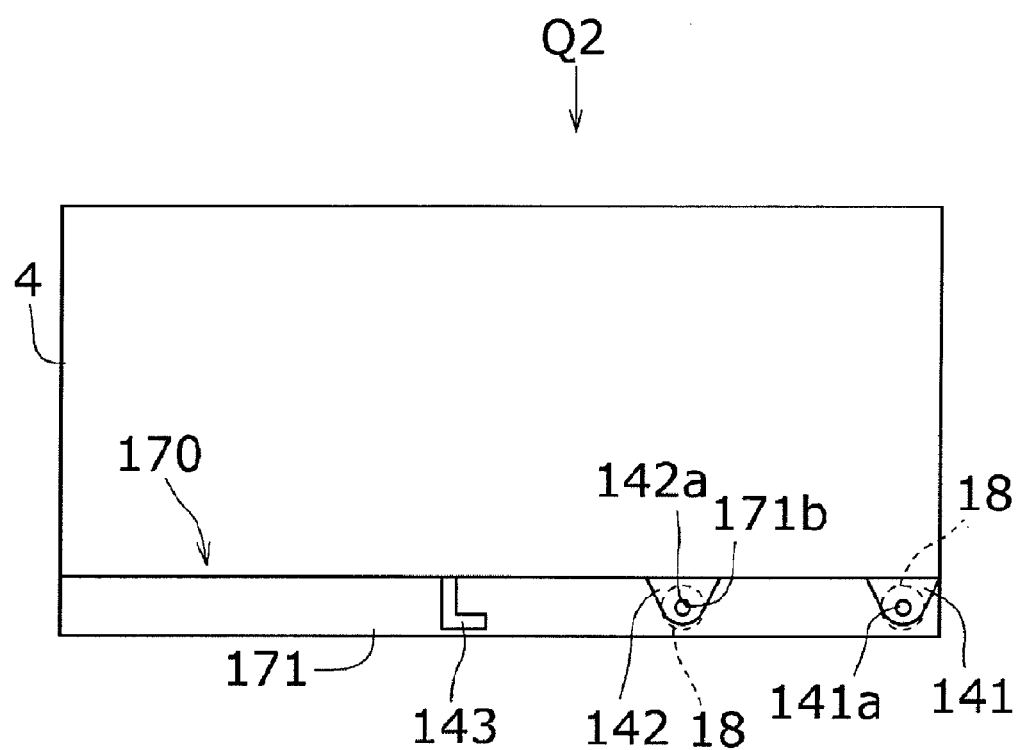
FIG. 13 is a side view showing the cargo bed and the support portion at the front position (the fifth embodiment)

FIG. 13 is a side view showing the cargo bed 4 and the support portion 170 at the front position Q2. The cargo bed 4 at the front position Q2 is tiltably or non-tiltably supported by the two or four pins 18 as well as the cargo bed 4 at the rear position Q1. When the cargo bed 4 is at the front position Q2, the first holes 171a of the support poles 171 overlap with the rear holes 141a of the rear brackets 141, and the second holes 171b of the support poles 171 overlap with the front holes 142a of the front brackets 142. The cargo bed 4 is tiltably supported on the support portion 170 by inserting the pins 18 into the first holes 171a and the rear holes 141a on the right and left sides. Further, the cargo bed 4 is non-tiltably supported on the support portion 170 by inserting the pins 18 into the second holes 172a and the front holes 142a on the right and left sides.

Other Embodiment

The present invention is not limited to the structures of the above embodiments, but includes various modifications not departing from the scope of the claims.

The seat support mechanism in the fourth embodiment is not limited to the configuration capable of coupling and separating the rear seat 230. The seat support mechanism may always support the rear seat 230. In this case, the rear seat 230 is always moved together with the cargo bed 4. The cargo bed 4 is integrated with the rear seat 230 not only in a case where the cargo bed 4 is moved in the back and forth direction by the cargo bed movement mechanism 100 but also in a case where the cargo bed 4 is pivoted and moved by the rotary support mechanism 300.

Next, examples of the pick-up style utility vehicle 1 will be described.

FIRST EXAMPLE

Figure 14:
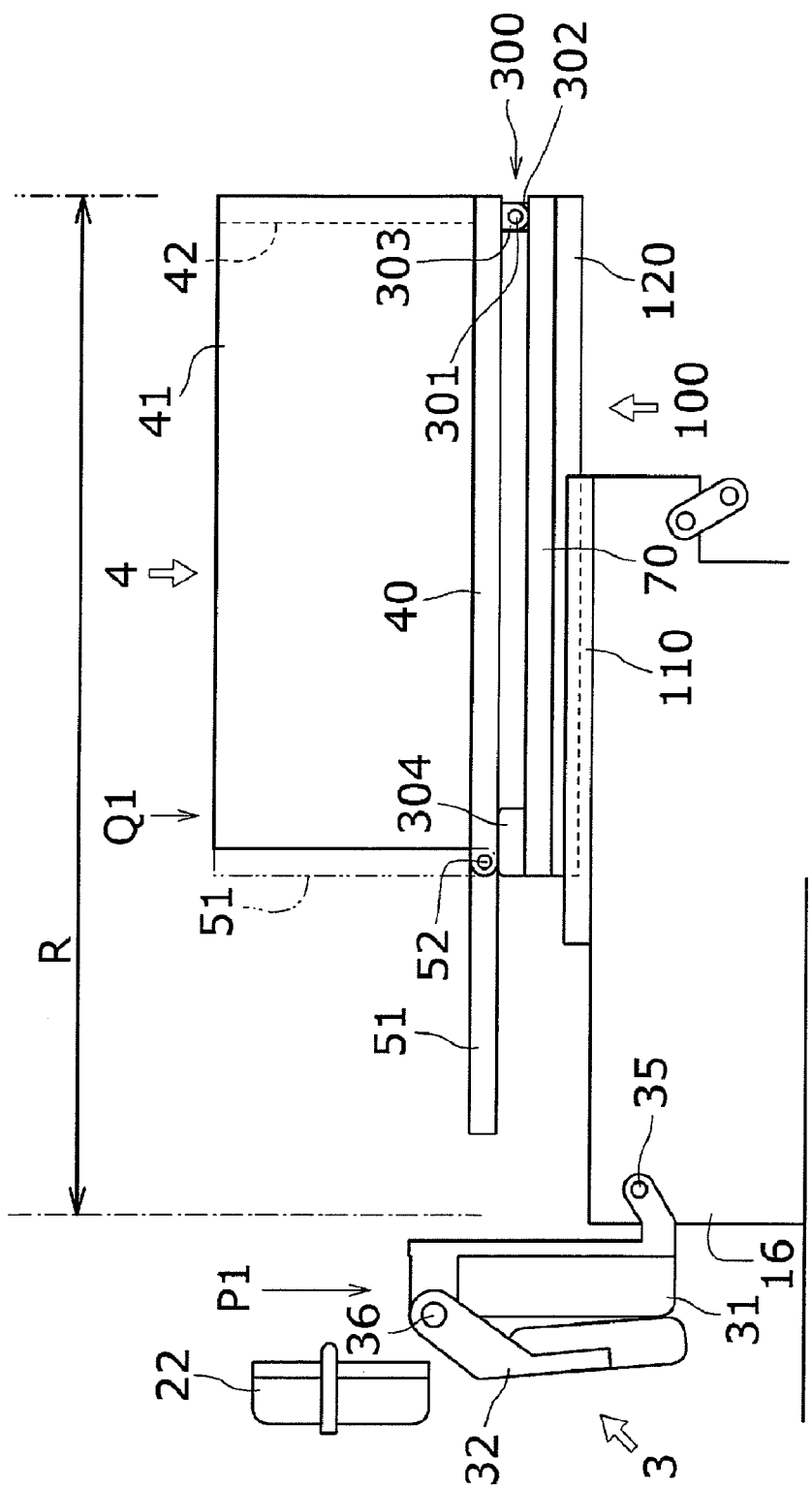
FIG. 14 is a side view showing the cargo bed at the rear position (a first example)

FIG. 14 shows the pick-up style utility vehicle 1 in a first example. FIG. 14 is a side view particularly showing the cargo bed 4 at the rear position Q1. The first example is the same as the first embodiment except a difference in terms of the cargo bed. In the first example, parts which are common to the first embodiment will be identified by the same reference numerals.

As shown in FIG. 14, the cargo bed 4 is provided with a front plate 51 instead of the screen 5. The front plate 51 has similar height to the side plates 41 and the rear plate 42. The front plate 51 is pivotably supported on a front end of the bottom plate 40 via a horizontal shaft 52. The first example has the same configuration as in the first embodiment except the front plate 51. Therefore, the cargo bed 4 may be arranged at the rear position Q1 or the front position Q2 in the first example.

In FIG. 14, the cargo bed 4 is at the rear position Q1. At this time, the cargo bed 4 may be expanded forward in the first example. The expansion of the cargo bed 4 is realized by bringing the front plate 51 down to the front side. When the front plate 51 brought down to the front side is parallel to the bottom plate 40, the bottom face of the cargo bed 4 is expanded by the front plate 51. The front plate 51 brought down to the front side is shown by a solid line in FIG. 14. The standing front plate 51 is shown by a double-dotted line.

SECOND EXAMPLE

Figure 15:
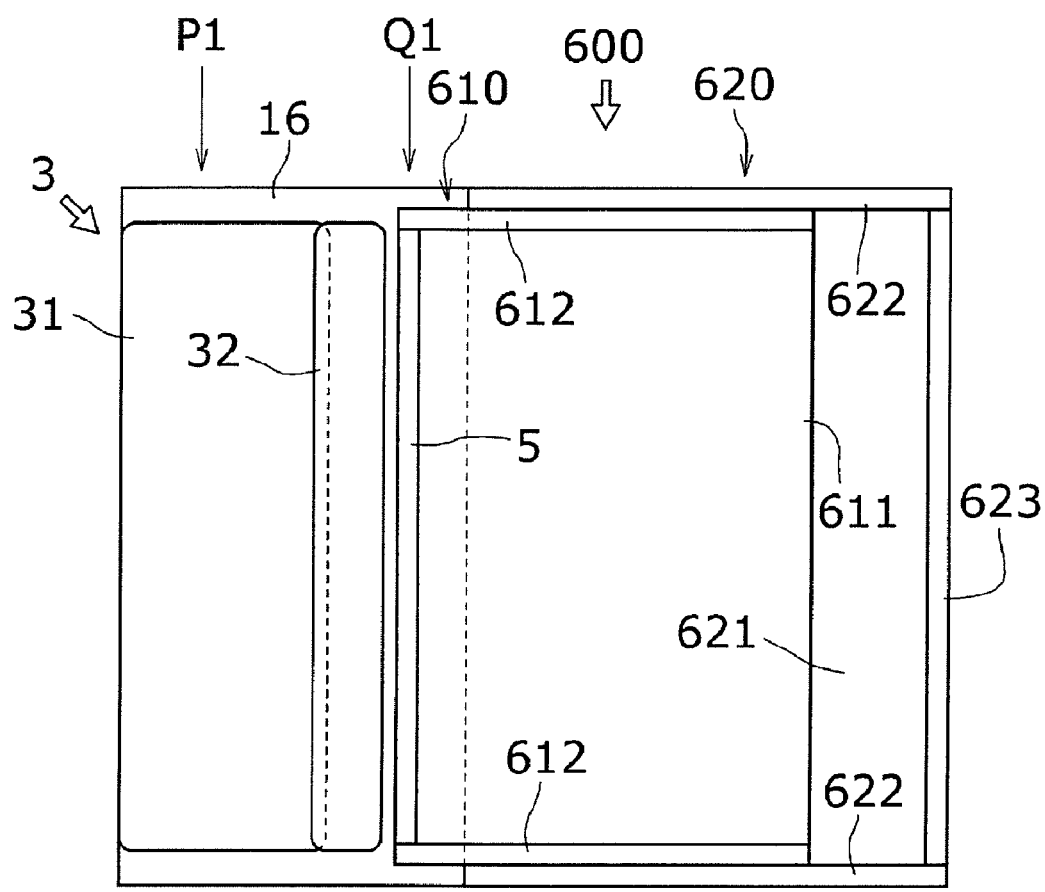
FIG. 15 is a plan view showing a cargo bed at the rear position (a second example)
Figure 16:
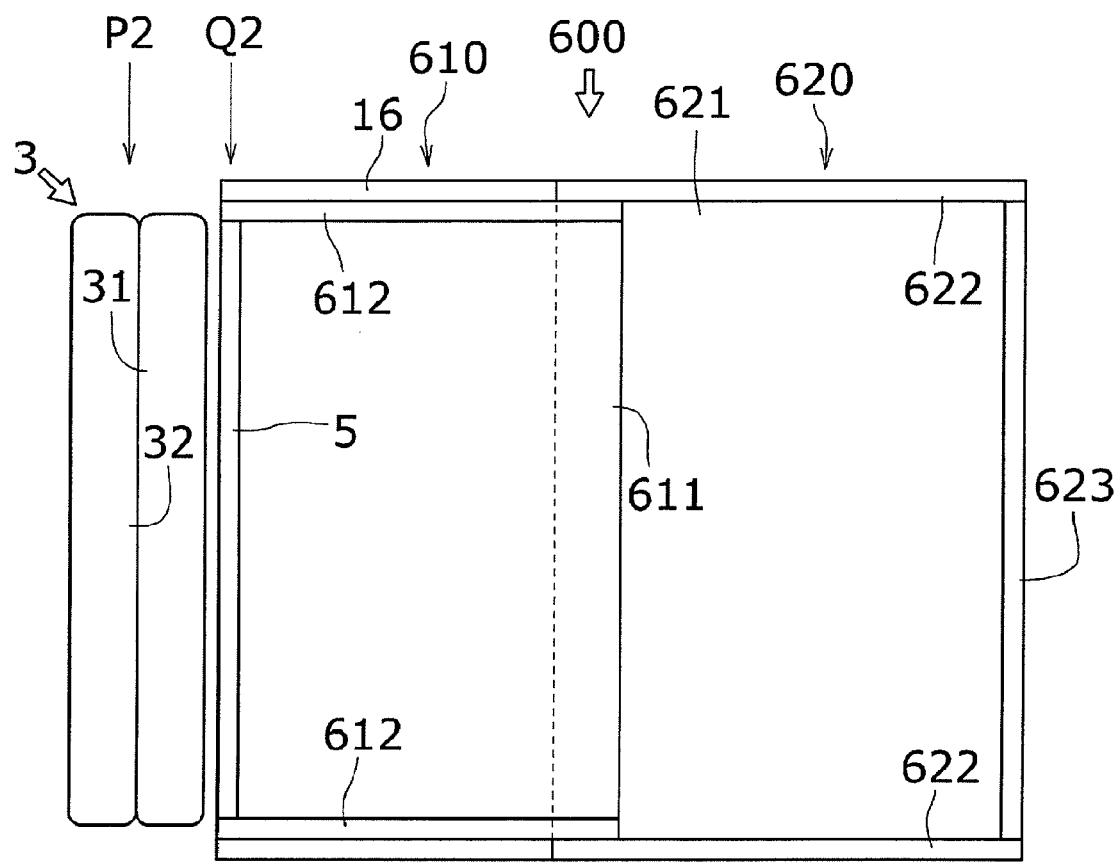
FIG. 16 is a plan view showing the cargo bed at the front position (the second example)
Figure 17:
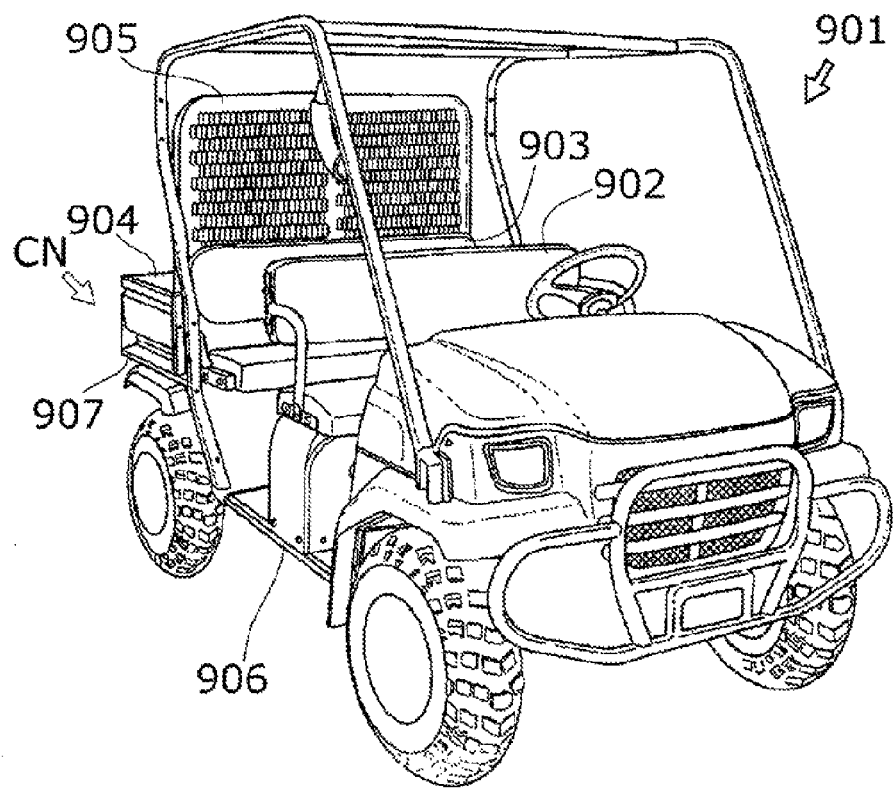
FIG. 17 is a perspective view showing a pick-up style utility vehicle (the related art)
Figure 18:
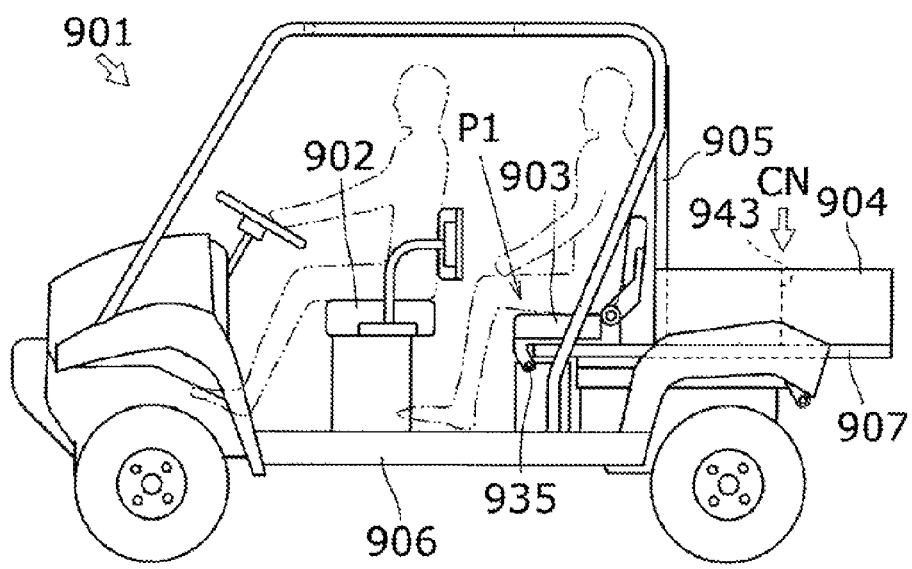
FIG. 18 is a side view showing the pick-up style utility vehicle in a normal state (the related art)
Figure 19:
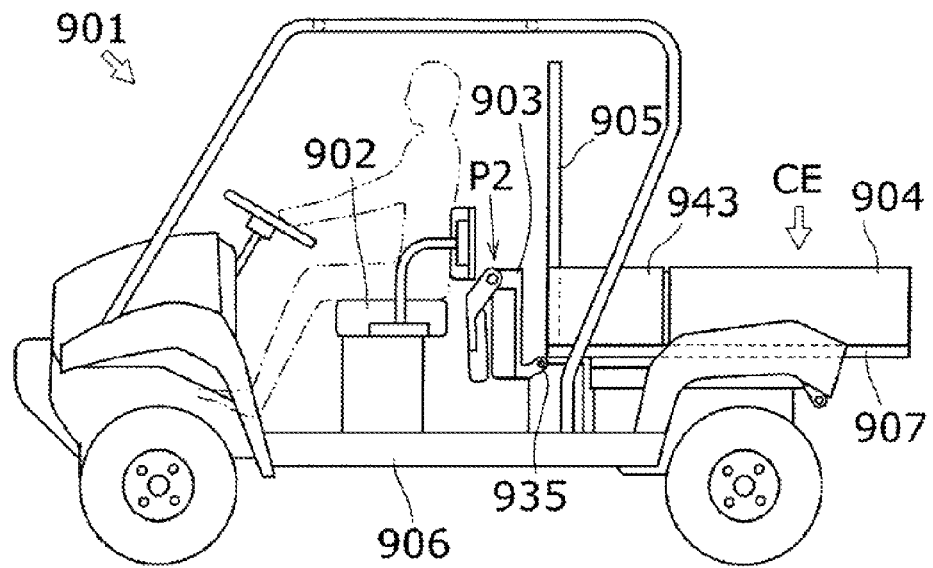
FIG. 19 is a side view showing the pick-up style utility vehicle in an expanded state (the related art)
Figure 20:
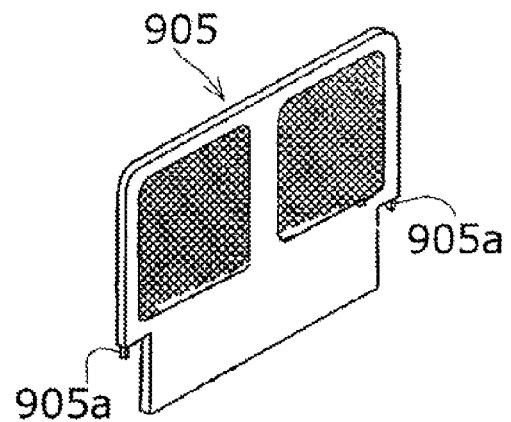
FIG. 20 is a perspective view showing a screen (the related art).

FIGS. 15 and 16 show the pick-up style utility vehicle 1 in a second example. The second example is the same as the first embodiment except a difference in terms of the cargo bed. A cargo bed 600 is provided in the second example instead of the cargo bed 4 in the first embodiment. In the second example, parts which are common to the first embodiment will be identified by the same reference numerals.

FIG. 15 is a plan view showing the cargo bed 600 in a normal state. The cargo bed 600 is provided with a front cargo bed portion 610 and a rear cargo bed portion 620. The rear cargo bed portion 620 is fixed to the rear support stand 16. The front cargo bed portion 610 is supported movably in the back and forth direction relative to the rear cargo bed portion 620.

The front cargo bed portion 610 is provided with a front bottom plate 611, two front side plates 612, and the screen 5. The two front side plates 612 are fixed to ends of the front bottom plate 611 in the right and left direction. The screen 5 is provided in a front end of the front bottom plate 611.

The rear cargo bed portion 620 is provided with a rear bottom plate 621, two rear side plates 622, and a rear plate 623. The two rear side plates 622 are fixed to ends of the rear bottom plate 621 in the right and left direction. The rear plate 623 is provided in a rear end of the rear bottom plate 621.

The cargo bed 600 is expandable in the back and forth direction with the front cargo bed portion 610 and the rear cargo bed portion 620.

In FIG. 15, the front cargo bed portion 610 is at the rear position Q1. At this time, the passengers can sit in the rear seat 3. A state of the cargo bed 600 at this time indicates the normal state.

FIG. 16 is a plan view showing the cargo bed 600 in an expanded state. In FIG. 16, the front cargo bed portion 610 is at the front position Q2. At this time, the rear seat 3 is shunted to the front side. A state of the cargo bed 600 at this time indicates the expanded state. Capacity of the cargo bed 600 in the expanded state is more than capacity of the cargo bed 600 in the normal state.

What is claimed is:

1. A pick-up style utility vehicle having a front seat, a rear seat and a chassis, the pick-up style utility vehicle further comprising:
    a cargo bed;
    a cargo bed movement mechanism for movably supporting the cargo bed on the chassis within a predetermined movement range in a back and forth direction,
    wherein the rear seat includes a main seat and a backrest,
    wherein the main seat and the backrest are separated from each other, the main seat is fixed to the chassis, and the backrest is fixed to the cargo bed, and
    wherein a seating face of the main seat is arranged below a lower level of the cargo bed.

2. The pick-up style utility vehicle according to claim 1, further comprising a supplementary screen, wherein the backrest is fixed to the cargo bed via the supplementary screen.

3. The pick-up style utility vehicle according to claim 1, wherein the cargo bed includes a screen and supplementary screen, wherein the backrest is fixed to the cargo bed via the supplementary screen such that the backrest moves with the cargo bed while the main seat remains in a fixed position relative to the chassis.

4. The pick-up style utility vehicle according to claim 1, wherein the backrest is forward of the main seat in a forward position of the cargo bed.

5. A pick-up style utility vehicle having a front seat and a rear seat, the pick-up style utility vehicle comprising:
   a cargo bed;
   a cargo bed movement mechanism for movably supporting the cargo bed within a predetermined movement range in a back and forth direction; and
   a seat support mechanism for supporting the rear seat on the cargo bed,
   wherein the front seat defines a storage space for partially storing the rear seat,
   wherein the rear seat is movable together with the cargo bed to permit partial storage of the rear seat in the storage space.

6. The pick-up style utility vehicle according to claim 3, wherein the seat support mechanism is capable of coupling and separating the cargo bed and the rear seat.

* * * * *